United States Patent [19]

Lycan

[11] Patent Number: 4,674,772
[45] Date of Patent: Jun. 23, 1987

[54] SOLUBLE PIPE SPACER

[76] Inventor: Goodwin A. Lycan, P.O. Box 23, Stevensville, Mich. 49123

[21] Appl. No.: 727,074

[22] Filed: Apr. 25, 1985

[51] Int. Cl.⁴ .............................................. F16L 13/04
[52] U.S. Cl. ...................................... 285/22; 285/286
[58] Field of Search ........................... 285/21, 22, 286

[56]     References Cited
    U.S. PATENT DOCUMENTS

| 1,990,077 | 2/1935 | Kershaw | 285/21 X |
| 2,409,865 | 10/1946 | Jewell | 285/22 |
| 4,346,918 | 8/1982 | Lycan | 285/22 |
| 4,505,420 | 3/1985 | Wittenbach | 285/22 X |

Primary Examiner—Dave W. Arola
Attorney, Agent, or Firm—Thomas J. Dodd

[57]     ABSTRACT

A wafer-shaped spacer ring for a pipe and fitting. The ring is formed of liquid soluble material to allow the ring to dissolve after the pipe and fitting are welded and the pipe is flushed.

3 Claims, 8 Drawing Figures

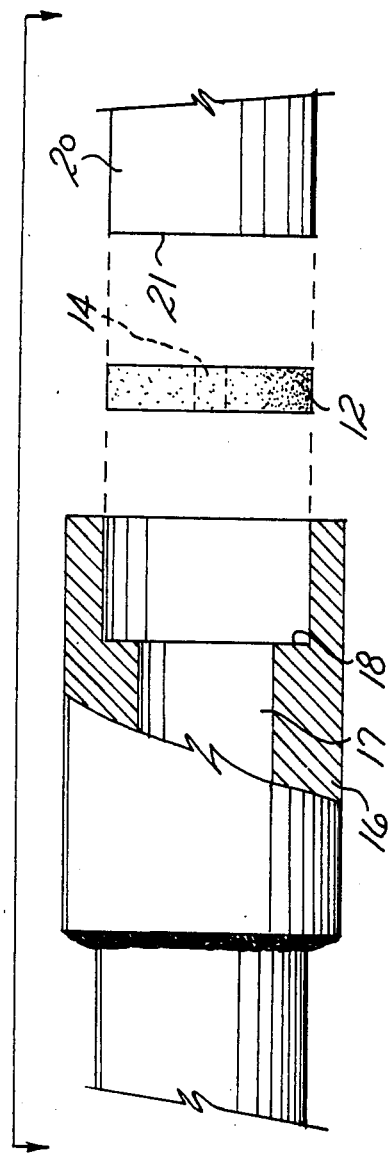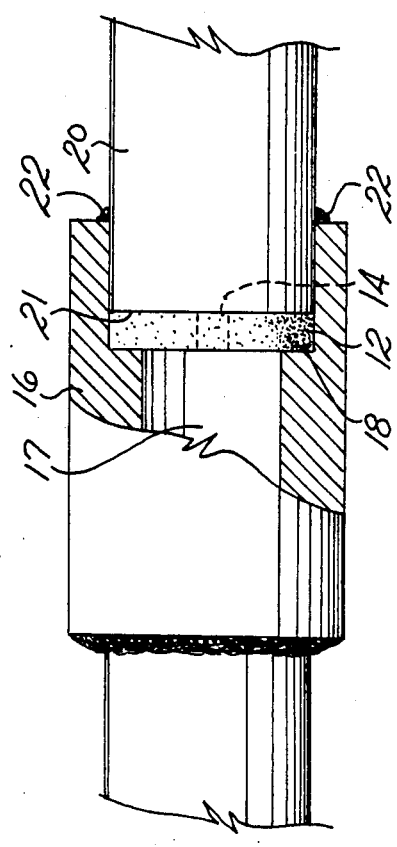

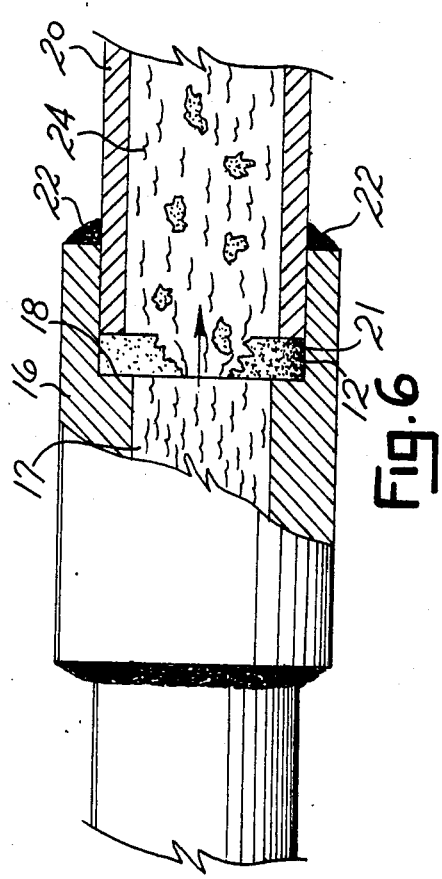
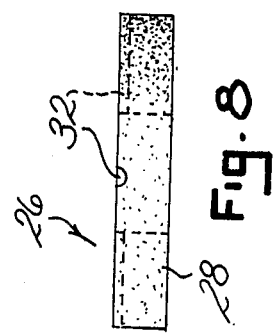
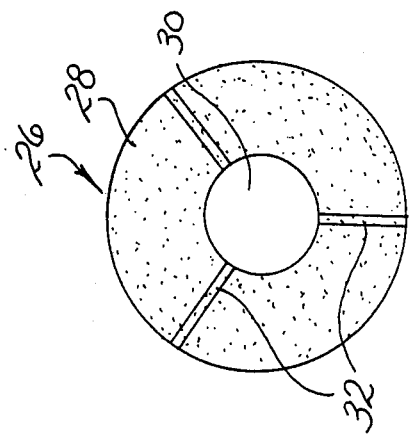

SOLUBLE PIPE SPACER

SUMMARY OF THE INVENTION

This invention relates to a pipe spacer and will have special application to a fluid soluble spacer positioned between a pipe and a fitting prior to welding of the pipe to the fitting.

Pipe spacers are used for insuring that the pipe is properly spaced from the fitting during welding operations. Due to pipe expansion during such welding, the pipe must be spaced from the fitting to prevent cracking of the fitting. An example of such a spacer is disclosed in U.S Pat. No. 4,346,918, incorporated herein by reference.

The spacer of this invention is formed of a fluid soluble material of wafer form having a generally centered opening which allows the spacer to dissolve upon fluid passing through the pipe and fitting after welding has been completed. In this manner, unrestricted fluid flow through an integral pipe and fitting is effected.

Accordingly, it is an object of this invention to provide for a fluid soluble pipe spacer which is positioned between a pipe and a fitting prior to welding.

Another object of this invention is to provide for a fluid soluble pipe spacer which is efficient and economical.

Other objects of this invention will become apparent upon a reading of the following description.

BRIEF DESCRIPTION OF THE DRAWINGS

FIG. 4 is a side view of a pipe, a fitting having parts broken away for illustration purposes and the spacer, shown in separated form.

FIG. 5 is a side view of the spacer in use with portions of the fitting broken away for purposes of illustration.

FIG. 6 is a side view of the spacer shown after welding is completed and fluid introduced into the pipe and fitting which are shown in partial sectional form.

FIG. 7 is a plan view of a second embodiment of the spacer.

FIG. 8 is a side view of the spacer of FIG. 7.

DESCRIPTION OF THE PREFERRED EMBODIMENTS

The preferred embodiments herein described are not intended to be exhaustive or to limit the invention to the precise forms disclosed. They are chosen and described to explain the principles of the invention and their application and practical use to enable others skilled in the art to utilize the invention.

Figure 1:
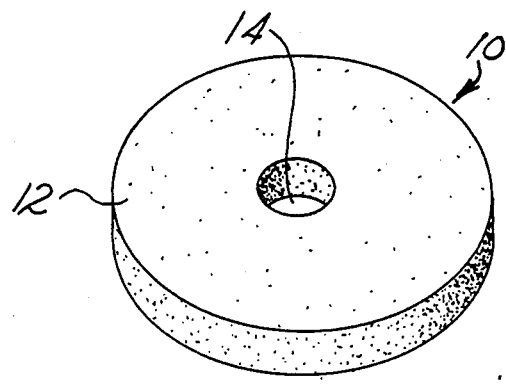
FIG. 1 is a perspective view of one embodiment of the soluble pipe spacer.
Figure 2:
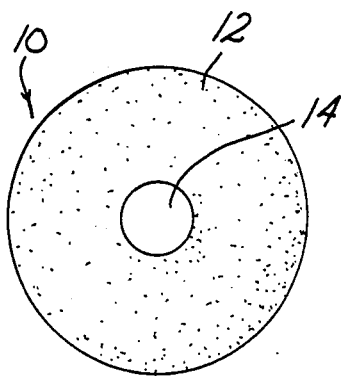
FIG. 2 is a plan view of the spacer.
Figure 3:
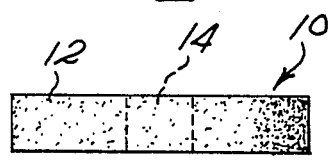
FIG. 3 is a side view of the spacer.

FIGS. 1-3 depict a pipe spacer 10 having a wafer-shaped body 12. Body 12 includes a central bore 14. Body 12 is formed of a fluid soluble material, such as salts of the alkali metals and alkaline earth metals. Two preferred salts are dicalcium phosphate and sodium carbonate. Spacer 10 is preferably 0.0625—0.090 inches in thickness.

Spacer 10 is utilized as shown in FIGS. 4-6. FIG. 4 depicts a fitting 16 which has a central bore 17 an an internal annular shoulder 18. Spacer 10 is positioned within fitting 16 overlying shoulder 18 as shown in FIG. 5 with spacer bore 14 being of lesser diameter than fitting bore 17. Spacer 10 has sufficient rigidity to allow for the initial abutment of pipe end 21 as the pipe is inserted into the fitting 16 without breaking. This allows the pipe to be properly spaced from the fitting shoulder 18. The spacer also has some compressibility to accommodate pipe expansion during welding. A pipe 20 is fitted into fitting bore 17 with its end 21 abutting spacer body 12 to as shown in FIG. 5. A weld 22 is then applied about fitting 16 and pipe 20. After welding, a liquid, such as water 24, is caused to flow through fitting 16 and pipe 20. Due to the small diameter of spacer bore 14, water 24 contacts spacer body 12 to cause spacer 10 to dissolve.

A modified form of soluble spacer 26 is depicted in FIGS. 7 and 8. Spacer 26 includes a body 28 formed of a salt of an alkali metal or alkaline earth metal and has a central bore 30. Spacer body 28 includes a plurality of radially extending grooves 32 which allow water or other liquid to be distributed over the faces to the outer peripheral edge formed in one or both of its faces of the body so as to allow for faster dissolution of spacer 26.

It is understood that the above description does not limit the invention to the above given details, and that it may be modified within the scope of the appended claims.

I claim:

1. In combination, a spacer positioned between the end of a pipe and an internal annular shoulder of a bore of a fitting into which bore said pipe is inserted in preparation for welding the pipe to the fitting with the spacer abutting the pipe and shoulder, said spacer comprising a wafer-shaped body formed of liquid soluble material and having a bore therethrough, a plurality of grooves formed in said body which extend from said body bore to an outer peripheral edge of the body, said grooves constituting channel means for distributing liquid passing through said fitting and pipe across said spacer body wherein said spacer body is dissolved.

2. The spacer of claim 1 wherein said spcer body is formed of a salt of the alkali metal or a salt of an alkaline earth metals.

3. The spacer of claim 2 wherein said spacer body is formed of dicalcium phosphate or sodium carbonate.

* * * * *